United States Patent
Fujii et al.

(10) Patent No.: US 11,732,650 B2
(45) Date of Patent: Aug. 22, 2023

(54) GAS TURBINE ENGINE

(71) Applicant: KAWASAKI JUKOGYO KABUSHIKI KAISHA, Kobe (JP)

(72) Inventors: Hiroshi Fujii, Kobe (JP); Takafumi Fujii, Kobe (JP); Tatsuya Okuwa, Kobe (JP); Hikaru Maesato, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/770,412

(22) PCT Filed: Oct. 20, 2020

(86) PCT No.: PCT/JP2020/039455
§ 371 (c)(1),
(2) Date: Apr. 20, 2022

(87) PCT Pub. No.: WO2021/079891
PCT Pub. Date: Apr. 29, 2021

(65) Prior Publication Data
US 2022/0389869 A1   Dec. 8, 2022

(30) Foreign Application Priority Data

Oct. 21, 2019   (JP) .................. 2019-191929

(51) Int. Cl.
*F02C 7/06* (2006.01)
*F01D 25/16* (2006.01)
*F01D 25/18* (2006.01)

(52) U.S. Cl.
CPC ............... *F02C 7/06* (2013.01); *F01D 25/16* (2013.01); *F01D 25/18* (2013.01); *F05D 2220/323* (2013.01); *F05D 2240/50* (2013.01); *F05D 2260/98* (2013.01)

(58) Field of Classification Search
CPC . F02C 7/06; F01D 25/16; F01D 25/18; F01D 25/20; F05D 2220/323; F05D 2240/50; F05D 2260/98; F05D 2260/601
USPC ......................................................... 184/6.11
See application file for complete search history.

(56) References Cited

U.S. PATENT DOCUMENTS

2020/0191054 A1\* 6/2020 Parnin ..................... F01D 25/20

FOREIGN PATENT DOCUMENTS

JP        2001-165390 A    6/2001

\* cited by examiner

*Primary Examiner* — Yi-Kai Wang
(74) *Attorney, Agent, or Firm* — Sughrue Mion, PLLC

(57) ABSTRACT

Provided is a gas turbine engine including a main passage through which compressed air extracted from a compressor is guided to a bearing; and an oil supply device that supplies oil to the main passage. The oil supply device includes a pressure reducer in the main passage; an oil tank a divider that is movable and divides an internal space of the container into an oil chamber storing the oil and an air chamber; an extruder including a cylinder and a piston that divides an internal space of the cylinder into a first chamber and a second chamber; a switching mechanism that switches between a first state where the first chamber communicates with a low-pressure space whose pressure is lower than pressure in the air chamber and a second state where the first chamber communicates with a high-pressure space whose pressure is higher than pressure in the downstream passage.

5 Claims, 4 Drawing Sheets

GAS TURBINE ENGINE

CROSS REFERENCE TO RELATED APPLICATIONS

This application is a National Stage of International Application No. PCT/JP2020/039455 filed Oct. 20, 2020, claiming priority based on Japanese Patent Application No. 2019-191929 filed Oct. 21, 2019.

TECHNICAL FIELD

One aspect of the present disclosure relates to a gas turbine engine utilized in a flying object, an aircraft, or the like.

BACKGROUND ART

PTL 1 discloses a mechanism that supplies oil mist to a bearing by air extracted from a compressor in a gas turbine engine of a flying object. This oil mist supply mechanism includes an oil mist generator and an oil tank. When the flying object flies, compressed air extracted from the compressor of the engine is introduced to the oil mist generator. Oil is sucked from the oil tank into the oil mist generator by the compressed air introduced to the oil mist generator, and the oil mist is generated. The generated oil mist is supplied to the bearing.

CITATION LIST

Patent Literature

PTL 1: Japanese Laid-Open Patent Application Publication No. 2001-165390

SUMMARY OF INVENTION

Technical Problem

In the above-described oil mist supply mechanism, the amount of oil sucked from the oil tank to the oil mist generator fluctuates in accordance with the pressure of the air extracted from the compressor. Therefore, the amount of oil supplied to the bearing may be excessive or inadequate.

Solution to Problem

A gas turbine engine according to one aspect of the present disclosure is a gas turbine engine in which a compressor, a combustor, and a turbine are arranged so as to be lined up along a rotating shaft. The gas turbine engine includes: a casing accommodating the compressor, the combustor, and the turbine; a bearing arranged inside the casing; a main passage through which compressed air extracted from the compressor is guided to the bearing; and an oil supply device that supplies oil to the main passage. The oil supply device includes: a pressure reducer that is disposed at the main passage and makes pressure in a downstream passage of the main passage lower than pressure in an upstream passage of the main passage, the downstream passage being a portion located downstream of the pressure reducer, the upstream passage being a portion located upstream of the pressure reducer; an oil tank including a container and a divider that divides an internal space of the container into an oil chamber storing the oil and an air chamber, the divider being movable toward the oil chamber when pressure in the air chamber is higher than pressure in the oil chamber; an extruder including a cylinder and a piston that divides an internal space of the cylinder into a first chamber and a second chamber; a switching mechanism that switches between a first state and a second state, the first state being a state where the first chamber communicates with a low-pressure space whose pressure is lower than the pressure in the air chamber, and the second chamber communicates with the oil chamber, the second state being a state where the first chamber communicates with a high-pressure space whose pressure is higher than the pressure in the downstream passage, and the second chamber communicates with the downstream passage; and a controller that controls the switching mechanism such that the switching mechanism switches between the first state and the second state.

According to the above configuration, when the switching mechanism is in the first state, the first chamber communicates with the low-pressure space whose pressure is lower than the pressure in the air chamber, and the second chamber communicates with the oil chamber. Therefore, the pressure in the first chamber becomes lower than the pressure in the second chamber, and with this, the piston moves toward the first chamber by the pressure difference between the first chamber and the second chamber. Thus, the oil flows from the oil chamber into the second chamber. When the switching mechanism switches from the first state to the second state, the first chamber communicates with the high-pressure space whose pressure is higher than the pressure in the downstream passage, and the second chamber communicates with the downstream passage. Therefore, the pressure in the first chamber becomes higher than the pressure in the second chamber, and with this, the piston moves toward the second chamber by the pressure difference between the first chamber and the second chamber. Thus, the oil with which the second chamber is filled is pushed out by the piston and supplied to the downstream passage.

The amount of oil supplied to the downstream passage since the switching mechanism switches from the first state to the second state becomes a predefined amount that depends on the size of the cylinder, a movable range of the piston, and the like. Therefore, the controller repeatedly switches the state of the switching mechanism, and with this, the amount of oil supplied to the bearing can be maintained constant.

Advantageous Effects of Invention

According to one aspect of the present disclosure, the amount of oil supplied to a bearing can be maintained constant in a gas turbine engine including a lubricator that supplies oil mist to the bearing by air extracted from a compressor.

DESCRIPTION OF EMBODIMENTS

Hereinafter, embodiments will be described with reference to the drawings.

Figure 1:
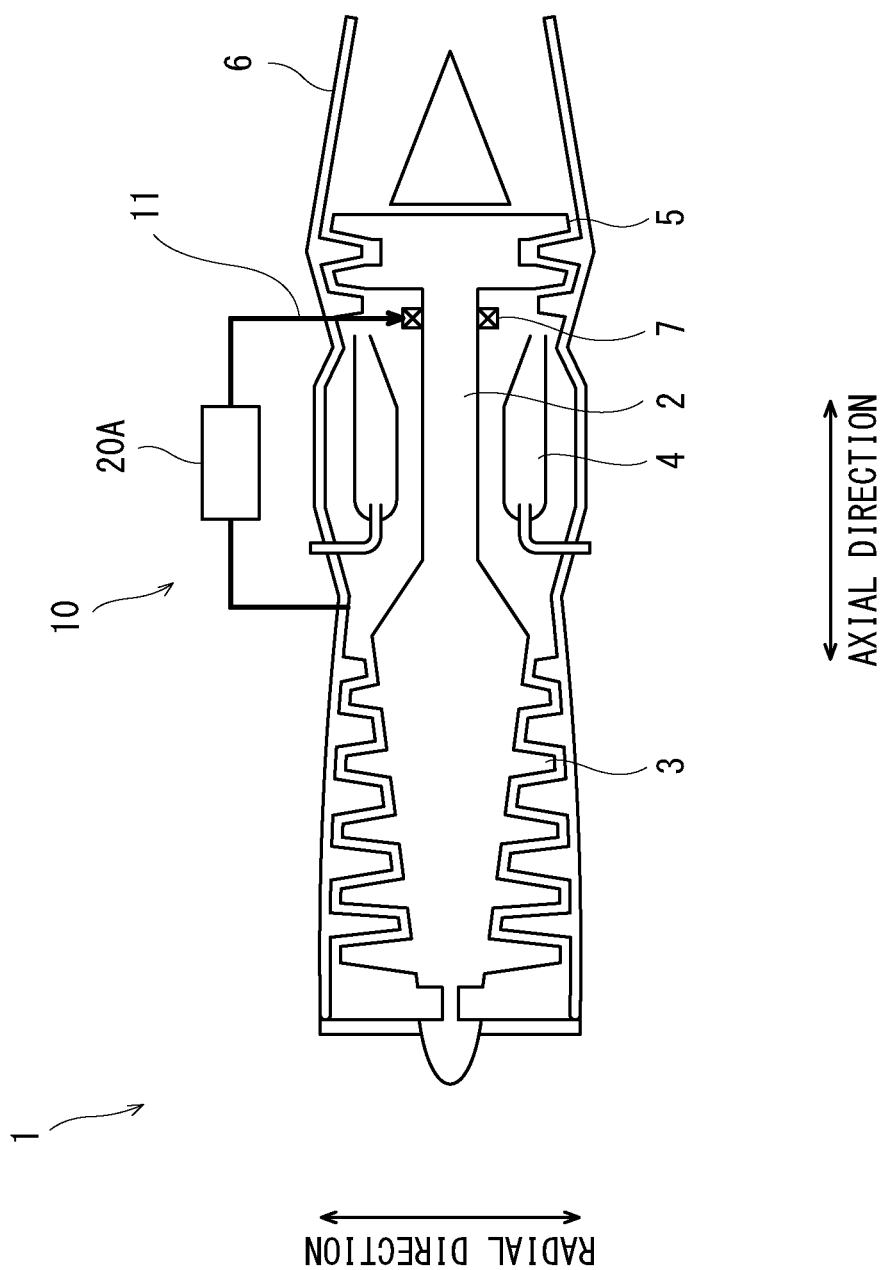
FIG. 1 is a schematic diagram of a gas turbine engine according to one embodiment of one aspect of the present disclosure.

FIG. 1 is a schematic diagram of a gas turbine engine 1 according to one embodiment of one aspect of the present disclosure. The gas turbine engine 1 includes a rotating shaft 2, a compressor 3, a combustor 4, a turbine 5, and a casing 6. The rotating shaft 2 extends in a front-rear direction of the gas turbine engine 1. The compressor 3, the combustor 4, and the turbine 5 are lined up in this order from a front side to a rear side along the rotating shaft 2. The casing 6 is a tubular object having an axis that coincides with a rotation axis of the rotating shaft 2. The casing 6 accommodates the rotating shaft 2, the compressor 3, the combustor 4, and the turbine 5. In the gas turbine engine 1, air introduced from an outside is compressed in the compressor 3 and is guided to the combustor 4, and fuel is combusted in the combustor 4 together with the compressed air. Energy of the obtained high-temperature, high-pressure combustion gas is taken out as rotational power by the turbine 5.

There are various types of gas turbine engines, and the type of the gas turbine engine 1 is not especially limited. The compressor 3 may be an axial flow compressor, a centrifugal compressor, or a combination of the axial flow compressor and the centrifugal compressor. The number of stages of the compressor 3 and the number of stages of the turbine 5 are arbitrary. Moreover, the gas turbine engine 1 may be a single-shaft gas turbine engine or a two-shaft gas turbine engine. The gas turbine engine 1 may be a turbofan engine or a turbojet engine.

The rotating shaft 2 is supported by bearings 7. The bearings 7 are arranged in an internal space (radially inner side) of the casing 6 along the rotating shaft 2. In FIG. 1, among the bearings 7, only the bearing 7 that is located downstream of the combustor 4 and supports the rotating shaft 2 is shown, and the other bearings 7 are not shown.

The gas turbine engine 1 includes an oil mist supply system 10 that supplies oil mist to the bearings 7. The oil mist supply system 10 supplies the oil mist to the bearings 7 by the pressure of the compressed air extracted from the compressor 3. The oil mist supply system 10 includes: a main passage 11 through which the compressed air extracted from the compressor 3 is guided to the bearings 7; and an oil supply device 20A that supplies oil to the main passage 11 through which the compressed air flows.

The main passage 11 guides the compressed air, extracted from the compressor 3, to the bearings 7. The main passage 11 can be comprised of, for example, a pipe, a casing, or a housing. In the following description, "upstream" and "downstream" in the main passage 11 respectively denote upstream and downstream in a direction in which a fluid flows in the main passage 11 from the compressor 3 toward the bearing 7.

The oil supply device 20A includes an oil tank 30 that stores the oil. The oil supply device 20A supplies the oil to the main passage 11 through which the compressed air flows. With this, the compressed air extracted from the compressor 3 and the oil supplied by the oil supply device 20A are mixed with each other to generate the oil mist. The generated oil mist is supplied to the bearings 7 through the main passage 11 by the pressure of the compressed air extracted from the compressor 3.

Figure 2:
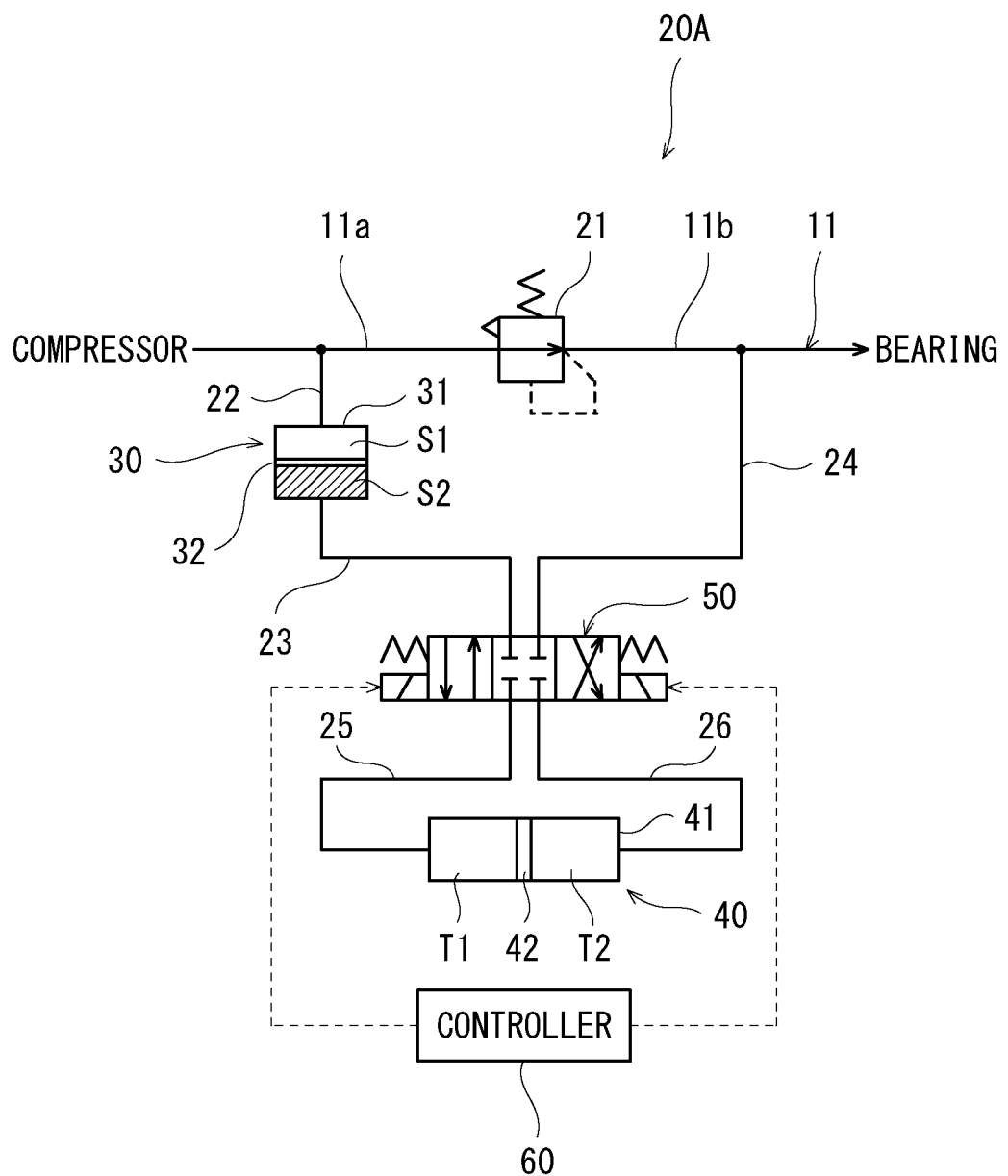
FIG. 2 is a schematic diagram of an oil supply device shown in FIG. 1.

FIG. 2 is a schematic diagram of the oil supply device 20A shown in FIG. 1. The oil supply device 20A includes a pressure reducer 21, the oil tank 30, an extruder 40, a switching mechanism 50, and a controller 60.

The pressure reducer 21 is disposed at the main passage 11. Hereinafter, a portion of the main passage 11 which portion is located upstream of the pressure reducer 21 is referred to as an "upstream passage 11a," and a portion of the main passage 11 which portion is located downstream of the pressure reducer 21 is referred to as a "downstream passage 11b." The pressure reducer 21 makes the pressure in the downstream passage 11b lower than the pressure in the upstream passage 11a. In the present embodiment, adopted as the pressure reducer 21 is a pressure reducing valve.

The oil tank 30 includes: a container 31 having an internal space; and a divider 32 that divides the internal space of the container 31 into an air chamber S1 and an oil chamber S2.

A tank inlet passage 22 is connected to the air chamber S1. The tank inlet passage 22 guides a part of the compressed air, flowing through the upstream passage 11a, to the air chamber S1. To be specific, one of ends of the tank inlet passage 22 is connected to the air chamber S1, and the other end of the tank inlet passage 22 is connected to the upstream passage 11a.

The oil chamber S2 stores the oil. A tank outlet passage 23 is connected to the oil chamber S2. The oil in the oil chamber S2 is discharged from the oil chamber S2 through the tank outlet passage 23.

The divider 32 is movable toward the oil chamber S2 when the pressure in the air chamber S1 is higher than the pressure in the oil chamber S2. In other words, the divider 32 is movable from a higher-pressure chamber out of the air chamber S1 and the oil chamber S2 to a lower-pressure chamber by a pressure difference between the air chamber S1 and the oil chamber S2. The divider 32 is comprised of, for example, a piston.

The extruder 40 includes a cylinder 41 having an internal space; and a piston 42 that divides the internal space of the cylinder 41 into a first chamber T1 and a second chamber T2. A first passage 25 through which a fluid is guided to the first chamber T1 or discharged from the first chamber T1 is connected to the first chamber T1. A second passage 26 through which a fluid is guided to the second chamber T2 or discharged from the second chamber T2 is connected to the second chamber T2.

When one of the pressure in the first chamber T1 and the pressure in the second chamber T2 is higher than the other, the piston 42 is movable from a higher-pressure chamber out of the first chamber T1 and the second chamber T2 to a lower-pressure chamber. In other words, the piston 42 is movable from the higher-pressure chamber out of the first chamber T1 and the second chamber T2 toward the lower-pressure chamber by the pressure difference between the first chamber T1 and the second chamber T2 and pushes out the fluid from the lower-pressure chamber out of the first chamber T1 and the second chamber T2 to an outside of the cylinder 41.

The switching mechanism 50 separates the first chamber T1 and the second chamber T2 from an outside or switches a destination with which the first chamber T1 communicates and a destination with which the second chamber T2 communicates. In the present embodiment, the switching mechanism 50 is a four-port directional switching valve. Moreover, the switching mechanism 50 is controlled by the controller 60. Hereinafter, the "switching mechanism 50" in the present embodiment is referred to as a "switching valve 50."

The switching valve 50 is connected to the oil chamber S2 by the tank outlet passage 23, is connected to the downstream passage 11b by an oil supply passage 24, is connected to the first chamber T1 by the first passage 25, and is connected to the second chamber T2 by the second passage 26. The switching valve 50 in the present embodiment is a three-position electromagnetic switching valve. The switching valve 50 is controlled by the controller 60 to switch from a neutral position, where all the passages 23, 24, 25, and 26 are blocked, to a first operation position (right position in FIG. 2) or a second operation position (left position in FIG. 2). The switching valve 50 may be a two-position switching valve which does not have the neutral position. Moreover, the switching valve 50 does not have to be an electromagnetic valve and may be, for example, an electric operated valve or an electromagnetic pilot switching valve.

At the first operation position, the switching valve 50 makes the oil supply passage 24 communicate with the first passage 25 and makes the tank outlet passage 23 communicate with the second passage 26. To be specific, at the first operation position, the switching valve 50 makes the first chamber T1 communicate with the downstream passage 11b and makes the second chamber T2 with the oil chamber S2. Hereinafter, a state where the switching valve 50 is at the first operation position, i.e., a state where the switching valve 50 makes the first chamber T1 communicate with the downstream passage 11b and makes the second chamber T2 communicate with the oil chamber S2 is referred to as a "first state."

On the other hand, at the second operation position, the switching valve 50 makes the tank outlet passage 23 communicate with the first passage 25 and makes the oil supply passage 24 communicate with the second passage 26. To be specific, at the second operation position, the switching valve 50 makes the first chamber T1 communicate with the oil chamber S2 and makes the second chamber T2 communicate with the downstream passage 11b. Hereinafter, a state where the switching valve 50 is at the second operation position, i.e., a state where the switching valve 50 makes the first chamber T1 communicate with the oil chamber S2 and makes the second chamber T2 communicate with the downstream passage 11b is referred to as a "second state."

The controller 60 controls the switching valve 50 such that the switching valve 50 switches between the first state and the second state. With this, the oil supply device 20A can supply a predetermined amount of oil per unit time to the main passage 11. Hereinafter, the flow of the operation of the oil supply device 20A will be described.

First, before the operation of the switching valve 50 starts, at least the first chamber T1, the second chamber T2, the tank outlet passage 23, the first passage 25, and the second passage 26 are filled with the oil. For example, when the switching valve 50 is at the neutral position, one of ends of the tank outlet passage 23 is closed by the switching valve 50, and therefore, the oil cannot be discharged from the oil chamber S2. On this account, in the container 31, the divider 32 of the oil tank 30 stops at a position where force of pushing the divider 32 by the compressed air in the air chamber S1 and force of pushing the divider 32 by the oil in the oil chamber S2 are balanced. In other words, the pressure in the oil chamber S2 is equal to the pressure in the air chamber S1 (the pressure in the upstream passage 11a).

When the switching valve 50 is controlled by the controller 60 to become the first state, the first chamber T1 communicates with the downstream passage 11b (corresponding to a "low-pressure space") whose pressure is lower than the pressure in the air chamber S1, and the second chamber T2 communicates with the oil chamber S2. With this, the oil in the first chamber T1 is pushed by the compressed air of the downstream passage 11b, and the oil in the second chamber T2 is pushed by the compressed air of the upstream passage 11a through the divider 32. Therefore, the pressure in the first chamber T1 becomes lower than the pressure in the second chamber T2, and with this, the piston 42 moves toward the first chamber T1 by the pressure difference between the first chamber T1 and the second chamber T2. Thus, the oil with which the first chamber T1 is filled is pushed out by the piston 42 and supplied through the first passage 25 and the oil supply passage 24 to the downstream passage 11b. Moreover, the oil flows from the oil chamber S2 through the tank outlet passage 23 and the second passage 26 into the second chamber T2.

When the switching valve 50 is controlled by the controller 60 to switch from the first state to the second state, the first chamber T1 communicates with the oil chamber S2 (corresponding to a "high-pressure space") whose pressure is higher than the pressure in the downstream passage 11b, and the second chamber T2 communicates with the downstream passage 11b. With this, the oil in the first chamber T1 is pushed by the compressed air of the upstream passage 11a through the divider 32, and the oil in the second chamber T2 is pushed by the compressed air of the downstream passage 11b. Therefore, the pressure in the first chamber T1 becomes higher than the pressure in the second chamber T2, and with this, the piston 42 moves toward the second chamber T2 by the pressure difference between the second chamber T2 and the first chamber T1. Thus, the oil flows from the oil chamber S2 through the tank outlet passage 23 and the first passage 25 into the first chamber T1. Moreover, the oil with which the second chamber T2 is filled is pushed out by the piston 42 and supplied through the second passage 26 and the oil supply passage 24 to the downstream passage 11b.

When the switching valve 50 is controlled by the controller 60 to switch from the second state to the first state, the oil with which the first chamber T1 is filled is supplied to the downstream passage 11b again, and the oil flows from the oil chamber S2 into the second chamber T2. As above, the controller 60 controls the switching valve 50 such that the switching valve 50 switches between the first state and the second state at a fixed cycle, and with this, the oil is intermittently supplied from the oil supply passage 24 to the main passage 11.

As described above, according to the gas turbine engine 1 of the present embodiment, the amount of oil supplied to the downstream passage 11b since the switching valve 50 switches between the first state and the second state becomes a predefined amount that depends on the size of the cylinder 41, a movable range of the piston 42, and the like. Therefore, the controller 60 repeatedly switches the state of the switching valve 50, and with this, the amount of oil supplied to the bearing 7 can be maintained constant. For example, the amount of oil supplied per unit time to the bearing 7 can be changed by adjusting the cycle of the switching of the state of the switching valve 50 by the controller 60.

Moreover, in the present embodiment, the air chamber S1 communicates with the upstream passage 11a. Therefore, the oil in the oil chamber S2 is pushed by the compressed air, flowing from the upstream passage 11a into the air chamber S1, through the divider 32. On this account, the pressure in the oil chamber S2 can be made higher than the pressure in the downstream passage 11b by simple configuration. To be specific, by simple configuration, while filling one of the first chamber T1 and the second chamber T2 with the oil, the oil can be discharged from the other of the first chamber T1 and the second chamber T2.

Moreover, in the present embodiment, when the switching valve 50 switches from the first state to the second state, the oil with which the second chamber T2 is filled is supplied to the downstream passage 11b, and in addition, the oil flows from the oil chamber S2 into the first chamber T1. Moreover, when the switching valve 50 switches from the second state to the first state, the oil with which the first chamber T1 is filled is supplied to the downstream passage 11b, and in addition, the oil flows from the oil chamber S2 into the second chamber T2. As above, in both of a case where the piston 42 moves in a direction from the first chamber T1 toward the second chamber T2 and a case where the piston 42 moves in a direction from the second chamber T2 toward the first chamber T1, the oil can be supplied to the downstream passage 11b. Therefore, for example, a maximum value of the amount of oil supplied per unit time to the bearing 7 can be improved.

Moreover, in the present embodiment, the switching of the destination with which the first chamber T1 of the cylinder 41 communicates and the switching of the destination with which the second chamber T2 of the cylinder 41 communicates can be realized by the single switching valve 50. Therefore, the oil supply device 20A can be made compact.

Hereinafter, modified examples showing variations of the oil supply device will be described. The same reference signs are used for the common or corresponding components in the above embodiment and the modified examples, and the repetition of the same explanation is avoided in the modified examples. Moreover, since the components of the gas turbine engine other than the oil supply device are the same as those in the above embodiment, the explanations thereof are omitted.

Modified Example 1

Figure 3:
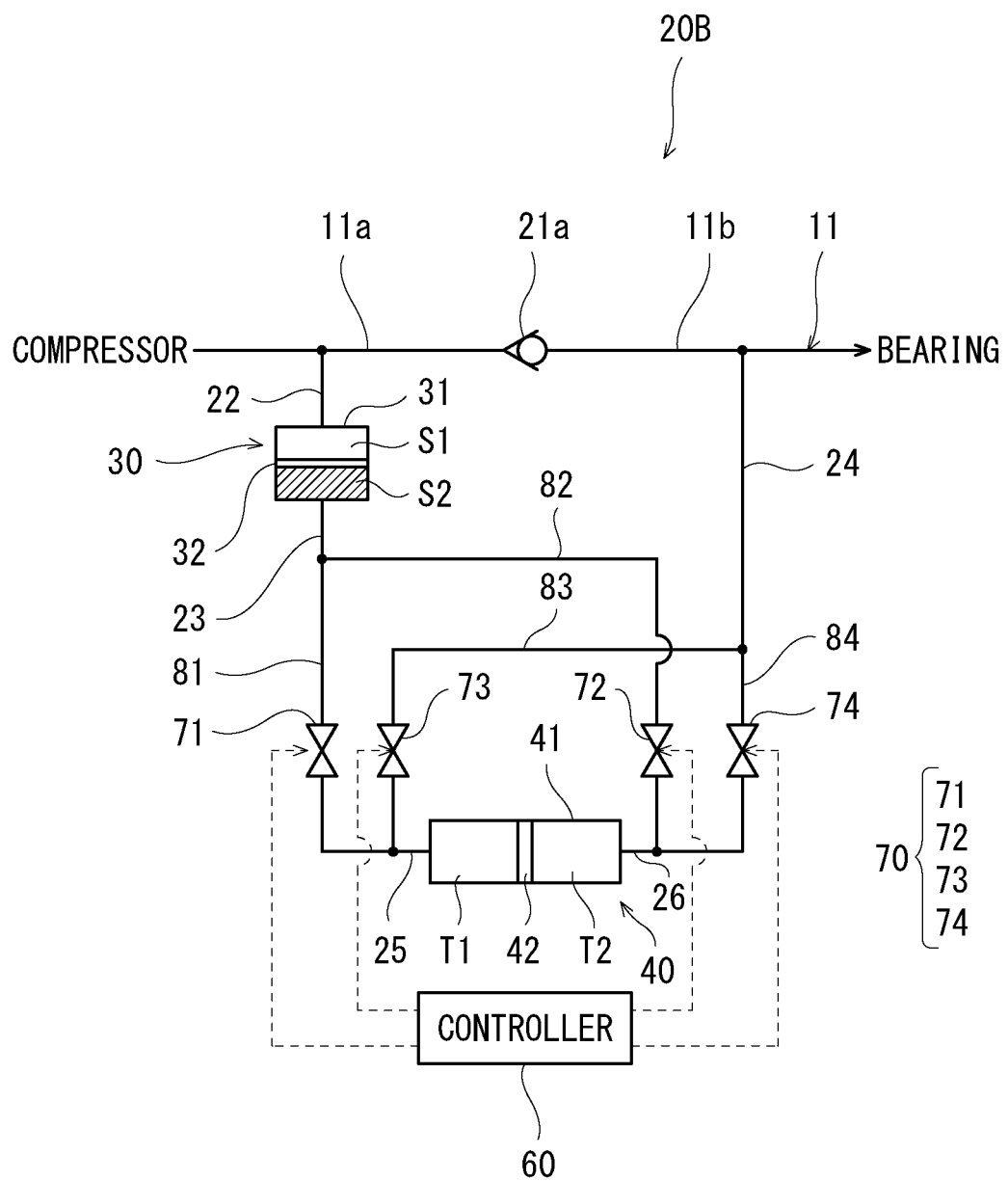
FIG. 3 is a schematic diagram of the oil supply device of Modified Example 1.

FIG. 3 is a schematic diagram of an oil supply device 20B of Modified Example 1. As shown in FIG. 3, in the oil supply device 20B, instead of the pressure reducing valve, a check valve that prevents the compressed air from flowing from the downstream passage 11b to the upstream passage 11a is adopted as the pressure reducer 21a disposed at the main passage 11.

Moreover, in the oil supply device 20B, a switching mechanism 70 that switches the destination with which the first chamber T1 communicates and the destination with which the second chamber T2 communicates includes a first on-off valve 71, a second on-off valve 72, a third on-off valve 73, and a fourth on-off valve 74. The first to fourth on-off valves 71 to 74 are electrically driven valves driven by a signal from the controller 60.

One of ends of the tank outlet passage 23 is connected to the oil chamber S2. A first branch passage 81 and a second branch passage 82 extend from the other end of the tank outlet passage 23. One of ends of the first branch passage 81 is connected to one of ends of the first passage 25, and the other end of the first passage 25 is connected to the first chamber T1. Moreover, one of ends of the second branch passage 82 is connected to one of ends of the second passage 26, and the other end of the second passage 26 is connected to the second chamber T2. The first on-off valve 71 and the second on-off valve 72 are respectively disposed at the first branch passage 81 and the second branch passage 82.

One of ends of the oil supply passage 24 is connected to the downstream passage 11b. A third branch passage 83 and a fourth branch passage 84 extend from the other end of the oil supply passage 24. One of ends of the third branch passage 83 is connected to a connection portion where the first branch passage 81 and the first passage 25 are connected to each other. One of ends of the fourth branch passage 84 is connected to a connection portion where the second branch passage 82 and the second passage 26 are connected to each other. The third on-off valve 73 and the fourth on-off valve 74 are respectively disposed at the third branch passage 83 and the fourth branch passage 84.

In the present modified example, the controller 60 controls the switching mechanism 70 such that the switching mechanism 70 switches between the first state where the first chamber T1 communicates with the downstream passage 11b (corresponding to the "low-pressure space"), and the second chamber T2 communicates with the oil chamber S2 and the second state where the first chamber T1 communicates with the oil chamber S2 (corresponding to the "high-pressure space"), and the second chamber T2 communicates with the downstream passage 11b. In the present modified example, the first state of the switching mechanism 70 is a state where: the first on-off valve 71 is closed; the second on-off valve 72 is open; the third on-off valve 73 is open; and the fourth on-off valve 74 is closed. Moreover, the second state of the switching mechanism 70 is a state where: the first on-off valve 71 is open; the second on-off valve 72 is closed; the third on-off valve 73 is closed; and the fourth on-off valve 74 is open.

The flow of the operation of the oil supply device 20B is basically the same as the flow of the operation of the oil supply device 20A. First, before the operation of the switching mechanism 70 starts, at least the first chamber T1, the second chamber T2, the tank outlet passage 23, the first passage 25, the second passage 26, the first branch passage 81, the second branch passage 82, a portion of the third branch passage 83 which portion is closer to the first passage 25 than the third on-off valve 73, and a portion of the fourth branch passage 84 which portion is closer to the second passage 26 than the fourth on-off valve 74 are filled with the oil.

When the switching mechanism 70 is controlled by the controller 60 to become the first state, the oil with which the first chamber T1 is filled is pushed out by the piston 42 and supplied through the first passage 25, the third branch passage 83, and the oil supply passage 24 to the downstream passage 11b. Moreover, the oil flows from the oil chamber S2 through the tank outlet passage 23, the second branch passage 82, and the second passage 26 into the second chamber T2.

When the switching mechanism 70 is controlled by the controller 60 to switch from the first state to the second state, the oil flows from the oil chamber S2 through the tank outlet passage 23, the first branch passage 81, and the first passage 25 into the first chamber T1. Moreover, the oil with which the second chamber T2 is filled is pushed out by the piston 42 and supplied through the second passage 26, the fourth branch passage 84, and the oil supply passage 24 to the downstream passage 11b.

When the switching mechanism 70 is controlled by the controller 60 to switch from the second state to the first state, the oil with which the first chamber T1 is filled is supplied to the downstream passage 11b, and the oil flows from the oil chamber S2 into the second chamber T2. As above, the controller 60 controls the first to fourth on-off valves 71 to 74 such that the switching mechanism 70 switches between the first state and the second state at a fixed cycle, and with this, the oil is intermittently supplied from the oil supply passage 24 to the main passage 11.

The present modified example can obtain the same effects as the above embodiment. Moreover, in the present modified example, since the pressure reducer 21a is the check valve, the downstream passage 11b can be reduced in pressure by more compact configuration than when a pressure reducing valve is adopted as the pressure reducer.

Modified Example 2

Figure 4:
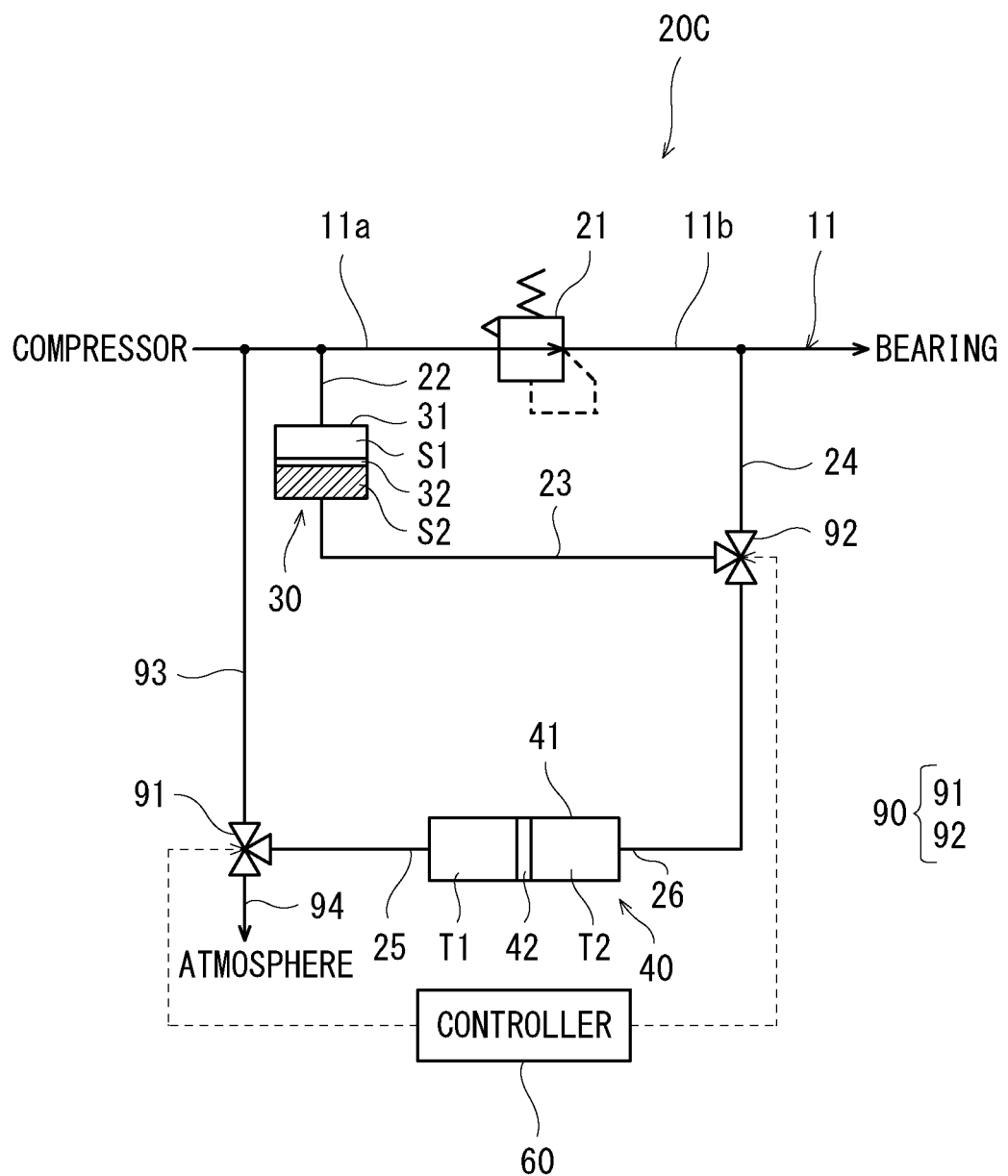
FIG. 4 is a schematic diagram of the oil supply device of Modified Example 2.

FIG. 4 is a schematic diagram of an oil supply device 20C of Modified Example 2. In the present modified example, unlike the above embodiment and Modified Example 1, the oil is supplied to the downstream passage 11b only when the piston 42 moves in a direction from the first chamber T1 toward the second chamber T2, and the oil is not supplied to the downstream passage 11b when the piston 42 moves in a direction from the second chamber T2 toward the first chamber T1.

Specifically, in the oil supply device 20C, a switching mechanism 90 that switches the destination with which the first chamber T1 communicates and the destination with which the second chamber T2 communicates includes a first three-way valve 91 and a second three-way valve 92. Each of the first and second three-way valves 91 and 92 is, for example, a three-port electromagnetic valve.

One of ends of the first passage 25 is connected to the first chamber T1, and the first three-way valve 91 is disposed at the other end of the first passage 25. An air introducing passage 93 and an atmosphere open passage 94 are connected to the first three-way valve 91. One of ends of the air introducing passage 93 is connected to the first three-way valve 91, and the other end of the air introducing passage 93 is connected to the upstream passage 11a. One of ends of the atmosphere open passage 94 is connected to the first three-way valve 91, and the other end of the atmosphere open passage 94 is open to the atmosphere.

One of ends of the second passage 26 is connected to the second chamber T2, and the second three-way valve 92 is disposed at the other end of the second passage 26. The tank outlet passage 23 and the oil supply passage 24 are connected to the second three-way valve 92. One of ends of the tank outlet passage 23 is connected to the second three-way valve 92, and the other end of the tank outlet passage 23 is connected to the oil chamber S2. One of ends of the oil supply passage 24 is connected to the second three-way valve 92, and the other end of the oil supply passage 24 is connected to the downstream passage 11b.

In the present modified example, the controller 60 controls the switching mechanism 90 such that the switching mechanism 90 switches between the first state where the first chamber T1 communicates with the atmosphere open passage 94 (corresponding to the "low-pressure space") whose pressure is lower than the pressure in the air chamber S1 and which is open to the atmosphere, and the second chamber T2 communicates with the oil chamber S2 and the second state where the first chamber T1 communicates with the upstream passage 11a (corresponding to the "high-pressure space") whose pressure is higher than the pressure in the downstream passage 11b, and the second chamber T2 communicates with the downstream passage 11b.

In the present modified example, the first state of the switching mechanism 70 is a state where: the first three-way valve 91 blocks the communication between the first passage 25 and the air introducing passage 93 and permits the communication between the first passage 25 and the atmosphere open passage 94; and the second three-way valve 92 blocks the communication between the second passage 26 and the oil supply passage 24 and permits the communication between the second passage 26 and the tank outlet passage 23. The second state of the switching mechanism 70 is a state where: the first three-way valve 91 blocks the communication between the first passage 25 and the atmosphere open passage 94 and permits the communication between the first passage 25 and the air introducing passage 93; and the second three-way valve 92 blocks the communication between the second passage 26 and the tank outlet passage 23 and permits the communication between the second passage 26 and the oil supply passage 24.

The flow of the operation of the oil supply device 20C will be described.

First, before the operation of the switching mechanism 70 starts, at least the second chamber T2, the tank outlet passage 23, and the second passage 26 are filled with the oil. The first chamber T1 is filled with air.

When the switching mechanism 90 is controlled by the controller 60 to become the first state, the first passage 25 and the atmosphere open passage 94 communicate with each other, and therefore, the first chamber T1 is open to the atmosphere. On the other hand, the second chamber T2 communicates with the oil chamber S2, and the oil in the second chamber T2 is pushed by the compressed air of the upstream passage 11a through the divider 32. Therefore, the pressure in the first chamber T1 which is atmospheric pressure becomes lower than the pressure in the second chamber T2, and with this, the piston 42 moves toward the first chamber T1 by the pressure difference between the first chamber T1 and the second chamber T2. Thus, the air in the first chamber T1 is pushed out by the piston 42 and discharged to an outside through the first passage 25 and the atmosphere open passage 94. Moreover, the oil flows from the oil chamber S2 through the tank outlet passage 23 and the second passage 26 into the second chamber T2.

When the switching mechanism 90 is controlled by the controller 60 to switch from the first state to the second state, the first chamber T1 communicates with the upstream passage 11a whose pressure is higher than the pressure in the downstream passage 11b, and the second chamber T2 communicates with the downstream passage 11b. With this, the pressure in the first chamber T1 becomes higher than the pressure in the second chamber T2, and therefore, the piston 42 moves toward the second chamber T2 by the pressure difference between the second chamber T2 and the first chamber T1. Thus, the compressed air is introduced from the upstream passage 11a through the air introducing passage 93 and the first passage 25 to the first chamber T1. Moreover, the oil with which the second chamber T2 is filled is pushed out by the piston 42 and supplied through the second passage 26 and the oil supply passage 24 to the downstream passage 11b.

When the switching mechanism 90 is controlled by the controller 60 to switch from the second state to the first state, the air in the first chamber T1 is discharged to an outside again, and the oil flows from the oil chamber S2 into the second chamber T2. As above, in the present modified example, the second chamber T2 is filled with the oil when the switching mechanism 90 becomes the first state, and the oil with which the second chamber T2 is filled is supplied to the downstream passage 11b when the switching mechanism 90 becomes the second state. As above, the controller 60 controls the switching mechanism 90 such that the switching mechanism 90 switches between the first state and the second state at a fixed cycle, and with this, the oil is intermittently supplied from the oil supply passage 24 to the main passage 11.

The present modified example can obtain the same effects as the above embodiment. Moreover, in the present modified example, a component that supplies the oil to the first chamber T1 in the oil supply device 20C becomes unnecessary, and the configuration of the oil supply device 20C can be simplified.

OTHER EMBODIMENTS

The present disclosure is not limited to the above embodiment, and various modifications may be made within the scope of the present disclosure.

For example, the components in the above embodiment and the modified examples may be suitably combined with each other. For example, in the above embodiment and Modified Example 2, a check valve may be adopted as the pressure reducer. In Modified Example 1, a pressure reducing valve may be adopted as the pressure reducer. Moreover, the pressure reducer may be a restrictor or the like.

Moreover, the configuration of the oil tank 30 is not limited to the configuration described in the above embodiment. For example, in the oil tank 30, the divider 32 may be comprised of a soft bag-shaped member.

Moreover, in the oil tank 30, the air chamber S1 does not have to communicate with the upstream passage 11a. For example, in Modified Example 2, the air chamber S1 may communicate with the downstream passage 11b. Moreover, for example, a high-pressure air tank may be connected to the air chamber S1 through an on-off valve. In this case, in the above embodiment and Modified Example 1, the high-pressure air tank may be able to set the pressure in the air chamber S1 to the pressure in the downstream passage 11b or higher. Moreover, in Modified Example 2, the high-pressure air tank may be able to set the pressure in the air chamber S1 to atmospheric pressure or higher. Furthermore, the high-pressure air tank may be supplied with the compressed air from the upstream passage 11a or may be supplied with high-pressure air from another high-pressure air source.

The configuration of the switching mechanism is not limited to those described in the above embodiment and the modified examples. The switching mechanism may switch between the first state where the first chamber communicates with the low-pressure space whose pressure is lower than the pressure in the air chamber, and the second chamber communicates with the oil chamber and the second state where the first chamber communicates with the high-pressure space whose pressure is higher than the pressure in the downstream passage, and the second chamber communicates with the downstream passage.

REFERENCE SIGNS LIST 1 gas turbine engine
2 rotating shaft
3 compressor
4 combustor
5 turbine
6 casing
7 bearing
11 main passage
11a upstream passage
11b downstream passage
20A, 20B, 20C oil supply device
21, 21a pressure reducer
30 oil tank
31 container
32 divider
34 tank inlet passage
35 tank outlet passage
40 extruder
41 cylinder
42 piston
50, 70, 90 switching mechanism
60 controller
S1 air chamber
S2 oil chamber
T1 first chamber
T2 second chamber

The invention claimed is:

1. A gas turbine engine in which a compressor, a combustor, and a turbine are arranged so as to be lined up along a rotating shaft,
the gas turbine engine comprising:
a casing accommodating the compressor, the combustor, and the turbine;
a bearing arranged inside the casing;
a main passage through which compressed air extracted from the compressor is guided to the bearing; and
an oil supply device that supplies oil to the main passage, wherein
the oil supply device includes
a pressure reducer that is disposed at the main passage and makes pressure in a downstream passage of the main passage lower than pressure in an upstream passage of the main passage, the downstream passage being a portion located downstream of the pressure reducer, the upstream passage being a portion located upstream of the pressure reducer,
an oil tank including a container and a divider that divides an internal space of the container into an oil chamber storing the oil and an air chamber, the divider being movable toward the oil chamber when pressure in the air chamber is higher than pressure in the oil chamber,
an extruder including a cylinder and a piston that divides an internal space of the cylinder into a first chamber and a second chamber,
a switching mechanism that switches between a first state and a second state, the first state being a state where the first chamber communicates with a low-pressure space whose pressure is lower than the pressure in the air chamber, and the second chamber communicates with the oil chamber, the second state being a state where the first chamber communicates with a high-pressure space whose pressure is higher than the pressure in the downstream passage, and the second chamber communicates with the downstream passage, and
a controller that controls the switching mechanism such that the switching mechanism switches between the first state and the second state.

2. The gas turbine engine according to claim 1, wherein:
the air chamber communicates with the upstream passage;
the low-pressure space is the downstream passage; and
the high-pressure space is the oil chamber.

3. The gas turbine engine according to claim 2, wherein:
the switching mechanism is a switching valve; and
the switching valve switches among a first operation position, a second operation position, and a neutral position, the first operation position being a position at which the first chamber communicates with the downstream passage, and the second chamber communicates with the oil chamber, the second operation position being a position at which the first chamber communicates with the oil chamber, and the second chamber communicates with the downstream passage, the neutral position being a position at which the first chamber and the second chamber are separated from the downstream passage and the oil chamber.

4. The gas turbine engine according to claim 1, wherein:
the low-pressure space is open to an atmosphere; and
the high-pressure space is the upstream passage.

5. The gas turbine engine according to claim 1, wherein the pressure reducer is a check valve that prevents the compressed air from flowing from the downstream passage to the upstream passage.

\* \* \* \* \*